United States Patent [19]
Borgholm et al.

[11] Patent Number: 5,698,027
[45] Date of Patent: Dec. 16, 1997

[54] METHOD AND PLANT FOR MANUFACTURING MINERALIZED PORTLAND CEMENT CLINKER

[75] Inventors: Hans Erik Borgholm, Valby; Duncan Herfort; Ole Mogensen, both of Alborg, all of Denmark

[73] Assignee: F. L. Smidth & Co. A/S, Denmark

[21] Appl. No.: 702,575

[22] PCT Filed: Feb. 21, 1995

[86] PCT No.: PCT/DK95/00075

§ 371 Date: Nov. 1, 1996

§ 102(e) Date: Nov. 1, 1996

[87] PCT Pub. No.: WO95/23773

PCT Pub. Date: Sep. 8, 1995

[30] Foreign Application Priority Data

Mar. 3, 1994 [DK] Denmark ................................. 0248/94
Mar. 29, 1994 [DK] Denmark ................................. 0362/94

[51] Int. Cl.⁶ ........................ C04B 7/04; C04B 7/42
[52] U.S. Cl. .................. 106/739; 106/748; 106/765; 106/768; 106/745; 106/771; 432/11; 432/106; 432/14; 432/266

[58] Field of Search ......................... 106/739, 748, 106/765, 745, 768, 771; 432/11, 9, 266, 13, 106, 14

[56] References Cited

U.S. PATENT DOCUMENTS

4,042,408  8/1977  Murray et al. ........................ 106/765
4,135,941  1/1979  Skalny et al. ........................ 106/768

*Primary Examiner*—Michael Marcheschi
*Attorney, Agent, or Firm*—Brumbaugh, Graves, Donohue & Raymond

[57] ABSTRACT

The invention relates to a method and a plant for manufacturing mineralized portland cement clinker. The method and plant provides for preheating, calcining, burning and finally cooling the clinker. The mineralizer may e.g. be gypsum, fluorine, or a waste product containing these or other mineralizers. The mineralizer is added to the feedstock after the feedstock has been fed to the process, preferably after the cyclone which handles the feed to the calciner, i.e. the last cyclone in the preheater, or the lowermost preheater stage in a plant which does not incorporate a calciner.

15 Claims, 1 Drawing Sheet

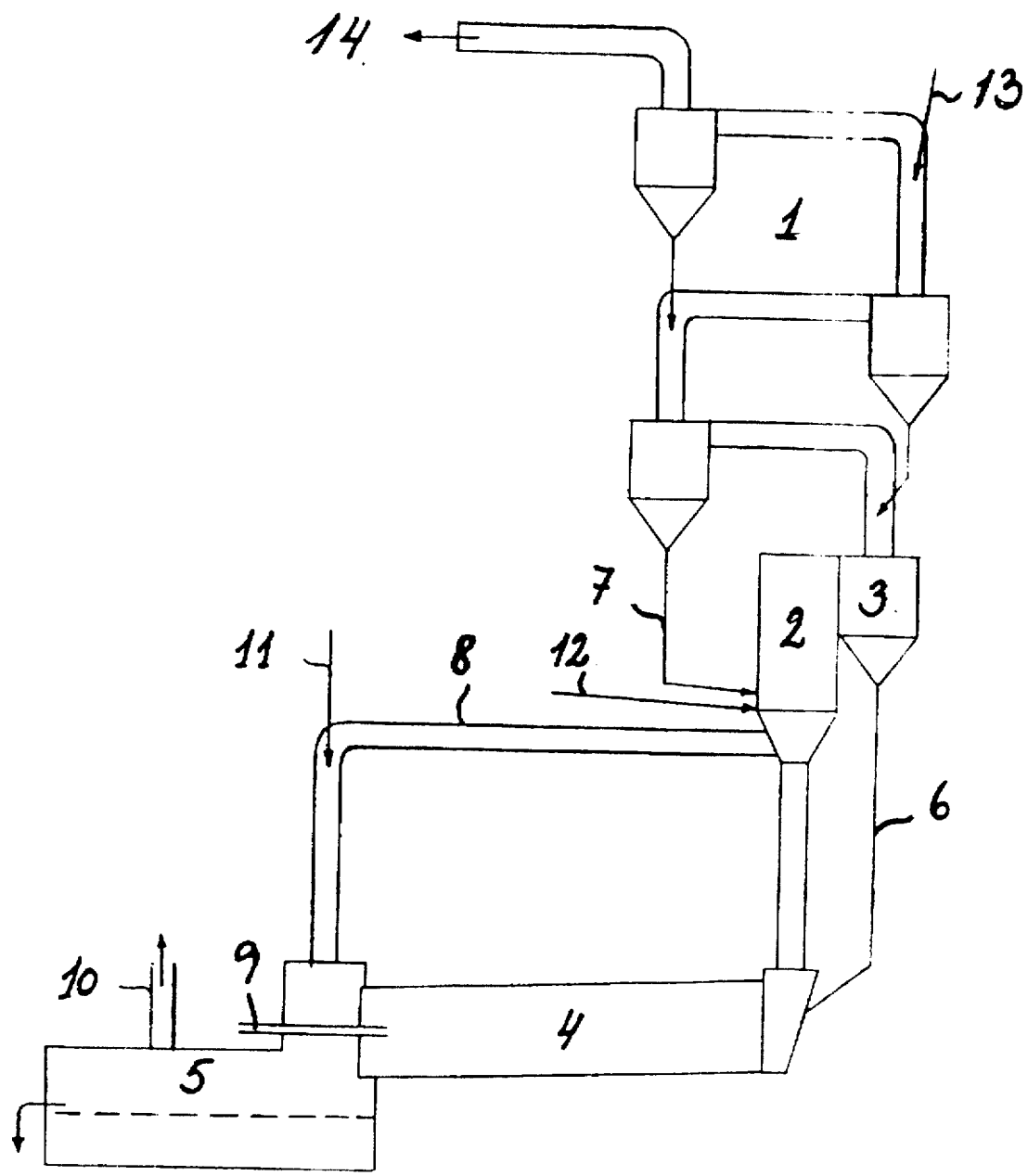

METHOD AND PLANT FOR MANUFACTURING MINERALIZED PORTLAND CEMENT CLINKER

This application is a 371 of international application number PCT/DK95/00075, filed Feb. 21, 1995.

BACKGROUND OF THE INVENTION

The present invention relates to a method and a plant for preparing mineralized Portland cement clinker in a dry or semidry process kiln system where the rawmix feedstock is being subjected to preheating, calcination, burning, and, finally, cooling.

The major oxide components of Portland cement clinker ($CaO$, $SiO_2$, $Al_2O_3$ and $Fe_2O_3$) normally account for 96–97% of the chemical analysis. The relative levels of these four oxides control the proportions of the four principal clinker minerals, $C_3S$, $C_2S$, $C_3A$ and $C_4AF$, and these proportions have a fundamental influence on cement properties. However, the minor components which account for the remaining 3–4% can have a very significant influence on the clinker-making process and the properties of the cement.

In the pure four component system $C_3S$ does not form below 1250° C. The presence of minor components can lower this temperature, thus facilitating $C_3S$ formation. The term mineralizer is used for components which encourage the formation of $C_3S$ and facilitate the sintering reactions in the rotary kiln.

A method for manufacturing mineralized clinker is known from the British patent No. 1 498 057. According to this method fluorine and sulphur are added during the rawmix preparation, usually in the form of flourite ($CaF_2$) and gypsum ($CaSO_4 \cdot 2H_2O$), the major goal being to achieve a clinker with a fluorine content of about 0.25 wt % and a $SO_3$ content of about 2.5 wt %. The method of said patent focuses on utilization in a rotary kiln of the wet process type, which was extensively used at the time of publication in 1975, but regarded today as being uneconomic due to the substantial amounts of energy needed for drying, and it has proven to be extremely difficult to transfer the method to the newer, more energy efficient dry or semidry process kiln systems incorporating a preheater and a calciner.

So, despite the very substantial improvements in the cement quality which can be achieved (see e.g. Moir, Phil Trans Roy Soc Lond., 1983, A310, 127–138) by this method according to the British patent No. 1 498 057, it is noteworthy that the field of application of this method has been very limited. This is probably ascribable to the operational difficulties associated with the implementation of the method, both in terms of controlling of clinker production and with respect to the occurrence of blockages in cyclones and riser ducts.

Therefore, it is the objective of the present invention to provide a method and a plant for manufacturing mineralized cement clinker, where the plant is constructed so that preheating and at least part of the calcination process takes place outside the kiln, in such a way problems associated with the known technique are avoided.

A first operational difficulty is to determine how to control the input of mineralizer and how, at the same time, to ensure the necessary degree of homogeneity in the rawmix feedstock. From the British patent No. 1 498 057 it appears that the mineralizer is mixed with the rawmix feedstock before it is burned (page 5, line 89–page 6, line 43).

Addition of the mineralizer in this way will, admittedly, result in a high degree of homogeneity, but it will not be possible to make a swift regulation of the mineralizer input relative to the raw materials so that the kiln operation and the properties of the finished cement clinker can be controlled in this manner, since the mineralizer constitutes a fixed percentage of the total quantity of raw materials.

Particularly in connection with the production of mineralized clinker with a high content of sulphate, it is of importance to control temperature variations in the burning zone. This is due to the tendency of the sulphate to decompose into $SO_2$ in the burning zone and to condense in the cooler regions of the kiln. When the burning zone temperature is increased, the evaporation of $SO_2$ will increase, which will result in higher concentrations of sulphates in the cooler regions of the kiln. The situation may become so critical that continued kiln operation becomes impossible because of ring formations in the kiln or the formation of build-ups or blockages in the preheater system unless the input of sulphate to the rawmix feedstock is temporarily reduced or eliminated altogether.

Conversely, if the burning zone temperature has decreased, a severe dust circulation between kiln and cooler may result and continued kiln operation becomes impossible unless the sulphate input is reduced or eliminated.

SUMMARY OF THE INVENTION

By using the method according to the invention, these problems are avoided since it is possible to use the amount of mineralizer input as a controllable parameter for the manufacture of mineralized clinker during off-set kiln operating conditions.

If appropriate, some of the mineralizer can be added to the rawmix feedstock prior to grinding and homogenization, whilst the remainder of the necessary mineralizer input is used for controlling the process. In some cases, the rawmix feedstock will have a natural content of mineralizer, but, provided that the content is not excessively high, it will still be possible to control the overall process by further addition of mineralizer. It is also possible to add two or more different mineralizers to different points in the process line, independent of each other, in order to control the process and the product.

A second operational difficulty which is well-known when burning ordinary Portland cement clinker with a high content of mineralizer, particularly $SO_3$ and F, in the rawmix feedstock, relates to the precipitation of solids and the occurrence of blockages when the material passes through a temperature range of about 700°–900° C.

It has been found that in the presence of significant concentrations of these mineralizers in the preheating zone, the condensation of chlorides on the preheater feedstock particles results in the formation of a minor, but significant, quantity of a melt phase at temperatures as low as 680° C., which, upon reaction with the oxide components in the feedstock at the high $CO_2$ partial pressures prevailing in the suspension preheater cyclones, solidifies through the formation of the mineral spurrite ($2C_2S \cdot CaCO_3$).

The formation of in excess of 5 wt % spurrite in the feedstock can result in impaired flow properties of the feedstock leading to severe build-ups and ultimately to production shutdown.

In U.S. Pat. No. 5,183,506 the method chosen to solve this problem involves the use of a special mixture of gypsum.

In order to reduce or eradicate the problems associated with build-ups in the preheater cyclones and the riser ducts between the cyclones, the mineralizer may advantageously be added at a stage where calcination has begun to take place, i.e. where the feedstock has been preheated to more than 700°–750° C., preferably more than 800° C.

Such action will further enhance production in ensuring a smooth flow of the feedstock through the preheater, since a substantial deterioration of the flow properties of the feedstock may occur when the mineralizer is added, depending on the type of mineralizer being selected.

In a precalcining plant with a separate cooler, as for example a grate cooler, it may further be advantageous to add the mineralizer to the tertiary air duct, through which heated air is directed from the cooler to the calciner. The air in the tertiary air duct will, in connection with this solution, ensure that the mineralizer is conveyed to the calciner.

If appropriate, the mineralizer may be subjected to prior drying in excess air from the cooler, before it is added to the tertiary air duct.

The mineralizer can be a sulphurous product, and in conjunction with this product another mineralizing component or an auxiliary substance containing fluorine or copper or zinc oxide may be used, but frequently, addition of such a component or substance will not be necessary since it is already present in the raw materials.

It has been recognized that through the combined presence of fluorine and sulphur components in the clinker at concentrations of at least 0.15 wt % F and 1.5 wt % $SO_3$, both early combination in the burning process and enhanced strength development of the finished product is achieved.

Through the reduction in the contents of the mineralizer components in the rawmix feedstock and through the introduction of the said components to the feedstock stream at a temperature greater than 800° C., the mineralizer content in the feedstock in the preheating zone is reduced, thereby effectively eliminating or at least significantly reducing the risk of blockages in the preheating zone, which is important when the mineralizer is a sulphur containing component. The exact degree of reduction in the mineralizer content in the feedstock in the preheating zone will obviously depend on the degree of recirculation characteristic of the kiln system in question, although it is clear that the said content can never be lower than the corresponding content in the rawmix feedstock. However, investigations have indicated that if the risk of blockages is to be eliminated or substantially reduced, contents of at the most 1.2 wt % $SO_3$ on a loss on ignition free basis or 0.14 wt % F on a loss on ignition free basis or both in the feedstock in the preheating zone should be observed and the same limits should therefor apply to the composition of the rawmix feedstock.

The sulphur containing component may inter alia be natural gypsum ($CaSO_4 \cdot 2H_2O$), hemihydrate ($CaSO_4 \cdot \frac{1}{2}H_2O$)(bassanite), anhydrite ($CaSO_4$), Ca or Mg langbeinite, barytes or other sulphur containing minerals also containing calcium or magnesium. The sulphur containing component could also be a waste product e.g. FGD (Flue Gas Desulphurization) gypsum, sulphite or sulphide containing desulphurization products, sulphate containing industrial byproducts such as ammonium or iron-based sulphates, cement kiln dust, sulphur-containing fuel such as petcoke or high sulphur coal or oil.

The desulphurization products are formed when flue gases, for example from power plants, are cleaned of $SO_2$. Semi-dry flue gas desulphurization produces a by-product of calcium sulphite and calcium sulphate, which may also contain flyash and other constituents. Modern, wet-process desulphurization methods are capable of producing a very clean gypsum, emerging initially, however, in the form of wet sludge or a filter cake.

After being subjected to drying, the last-mentioned product may, for example, find application in gypsum wallboard manufacturing or it may replace natural gypsum in the manufacture of cement where it is inter-ground with the clinker in the cement mill. At the present point in time, the application range for the desulphurization product, derived from semi-dry desulphurization, is very limited, and it is further a complicating factor that disposal of the product is difficult due to the unfavourable theological properties of the product.

Another interesting by-product is anhydrite contaminated with $CaF_2$ and $H_2SO_4$ formed during the manufacture of hydrofluoric acid from fluorspar and sulphuric acid.

In the future, another by-product may emerge which involves the destruction of asbestos: one method proposed entails the dissolution of asbestos in hydrofluoric acid (HF) followed by neutralization with burnt lime, whereby a product consisting of MgO, $SiO_2$, $CaF_2$ and a certain Mount of $CaSO_4 \cdot 2H_2O$ results. Finally, another option to be considered is the use of phospho-gypsum (i.e. the gypsum which is the by-product derived from the manufacture of phosphoric acid on the basis of raw phosphate and sulphuric acid).

By means of the method according to the invention it is now possible to employ these waste products in the cement manufacturing process in an appropriate manner, since experience has shown that the operating difficulties discussed above may be avoided when the waste products are not processed together with the raw meal, but rather added separately to the process. Examples of suitable fluorine containing components are fluorite, fluor apatite, cryolite, or industrial byproducts containing fluorine such as hexafluorosilicic acid or silicontetrafluoride, preferably fluorite.

BRIEF DESCRIPTION OF THE DRAWINGS

FIG. 1 shows an embodiment of the invention.

DESCRIPTION OF THE PREFERRED EMBODIMENTS

The drawing shows a cement kiln plant of the generally known type which comprises a preheater 1, which in the figure consists of three cyclones, a calciner 2 with a separation cyclone 3 and a rotary kiln 4 with clinker cooler 5.

In a plant of the aforementioned kind, manufacturing of cement is carried out according to a method where cement raw meal is introduced at the inlet 13 at the top of the preheater 1, passing through the preheater in counter-current with the exhaust gases from the kiln 4 and the calciner 2. The exhaust gases are drawn up through the preheater 1 and discharged at 14 by means of a not shown exhaust gas fan. The raw meal is conveyed from the preheater 1 via a duct 7 down into the calciner 2 where it is calcined and passed on in suspension to the separation cyclone 3. Here the calcined raw meal is separated from the exhaust gases and conveyed by means of a duct 6 to the rotary kiln 4 where, by means of heat from the burner 9, the rawmeal is burned into clinker. The clinker then drops into the cooler 5 where it is aircooled. One part of the hot air thus produced passes to the rotary kiln, another part is directed through the tertiary air duct to the calciner. The remainder of the cooling air drawn into the cooler is diverted at 10.

A mineralizer which does not have any detrimental effect upon the flow properties of the raw meal, may, in principle, be added at any location after the raw meal has left the store where the raw meal can have been subjected to homogenization, and after the raw meal has been added to the process through a dosale apparatus.

A mineralizer, such as a sulphur containing component emerging for example as a by-product of flue gas desulphurization, may advantageously be fed to the calciner either directly via the duct 12 or by adding the mineralizer to the tertiary air duct 8 via the duct 11 so that the mineralizer is carried by the hot air from the cooler to the calciner. Thus, when the mineralizer is directed into the calciner and into the subsequent separation cyclone, the calciner and the cyclone will operate as an homogenizer, facilitating thorough mixing of $SO_3$ in the raw meal stream.

If the by-product contains sulphur in a lower state of oxidation, e.g. sulphite or sulphide, it may advantageously be added at 11 or 12 so that these sulphur compounds can be oxidated into sulphate in the calciner. If added at 13, this will result in the formation of a small amount of $SO_2$ being entrained in the exhaust gases. If drying of the mineralizer is required prior to use, it will be possible to extract hot excess air from the cooler at 10 for use in a conventional drying apparatus.

In a preferred embodiment of the method where both sulphur and fluorine might be present, the composition of the rawmix feedstock is such that the sulphur content $X_S$ is at the most 1.0% by weight calculated as $SO_3$ on a LOI (Loss On Ignition) free basis, or the fluorine content $X_F$, is at the most 0.12% by weight calculated on a LOI free basis, or both of these conditions are fulfilled, in particular that $X_S$ is at the most 0.8 wt %, or $X_F$ is at the most 0.10 wt %, or both, especially that $X_S$ is at the most 0.6 wt %, or $X_F$ is at the most 0.08 wt %, or both, such as that $X_S$ is at the most 0.4 wt %, or $X_F$ is at the most 0.06 wt %, or both.

We claim:

1. A method for preparing mineralized Portland cement clinker in a kiln system, said method comprising the steps of preheating a rawmix feedstock in a preheater, calcining the preheated feedstock in a calciner, burning the calcined feedstock in the kiln to form clinker, and then cooling the clinker in a cooler, said method further comprising adding a mineralizer to the feedstock such that the mineralizer and feedstock are mixed together and homogenized in suspension in at least one of the preheater or calciner.

2. A method according to claim 1, wherein the mineralizer is added to the feedstock after the feedstock has been heated to more than 800° C.

3. A method according to claim 1, wherein the addition of the mineralizer is carried out in a zone where the rawmix feedstock is being preheated.

4. A method according to claim 1, wherein the system is one having a calcining zone and the mineralizer is added to this zone.

5. A method according to claim 1 wherein the kiln system is one having a calcining zone and the mineralizer is added to a tertiary air duct connecting the cooler to the calcining zone.

6. A method according to any one of claims 1–5, wherein the mineralizer is a sulphurous product selected from natural gypsum, hemihydrate (bassanite), anhydrite, langbeinite, barytes or other sulphurous minerals containing calcium or magnesium, or wherein the mineralizer is a sulphurous waste product selected from sulphates, FGD (Flue Gas Desulphurization) gypsum, sulphite or sulphide-containing desulphurization products, sulphate-containing industrial byproducts, ammonium or iron-based sulphates, cement kiln dust, sulphur-containing fuel, petcoke, or high sulphur coal or oil.

7. A method according to any one of claims 1–5, wherein the mineralizer is a fluorine-containing product selected from fluorite, fluorapatite, cryolite, industrial by products containing fluorine, hexafluorosilicic acid, or silicon tetrafluoride, acid, silicon tetrafluoride.

8. A method for preparing mineralized Portland cement clinker in a kiln system, said clinker having a sulphur content of at least 1.5% by weight calculated as $SO_3$ and a fluorine content of at least 0.15% by weight calculated as F, in a kiln system comprising the steps of preheating a raw mix feedstock composition in a preheater, calcining the preheated feedstock in a calciner, burning the calcined feedstock in the kiln to form clinker, and then cooling the clinker in a cooler, wherein the composition of the rawmix feedstock is such that at least one of the following conditions is fulfilled:

1) the sulphur content $X_S$ is at the most 1.2% by weight calculated as $SO_3$ on a LOI free basis, 2) the fluorine content $X_F$ is at the most 0.14% by weight calculated on a LOI free basis, and wherein at least one of a sulphur-containing component or a fluorine-containing component is introduced to the feedstock at a point in the method where the feedstock has a temperature above 800° C. and at a point wherein the sulphur-containing component or fluorine containing component or both are mixed together and homogenized in suspension in at least one of the preheater or calciner, the amount of the sulphur-containing component, the fluorine-containing component, or both, being sufficient to ensure that a final Portland cement clinker has the required sulphur and fluorine content.

9. A method according to claim 8 wherein $X_S$ is at the most 0.8% by weight, or $X_F$ is at the most 0.10% by weight, or both.

10. A method according to claim 8 wherein $X_S$ is at the most 0.4% by weight, or $X_F$ is at the most 0.06% by weight, or both.

11. A method according to any one of claims 8–10, wherein the addition of the sulphur containing component, the fluorine-containing component, or both, is carried out in a zone where the rawmix feedstock is being preheated.

12. A method according to any one of claims 8–10, wherein the kiln system is one having a calcining zone and the sulphur containing component, the fluorine component, or both, is added to this calcining zone.

13. A plant for manufacturing mineralized clinker which comprises an inlet for processed rawmix, a preheater, a calcining zone, a kiln, and a cooler, and wherein the plant has an inlet for a mineralizer located downstream from the position at which the rawmix is fed.

14. A plant according to claim 13, wherein the inlet for the mineralizer is located after the preheater but before the kiln.

15. A plant according to claim 13, said plant further comprising a tertiary air duct for conveying hot air from the cooler to the calcining zone, and wherein the inlet for the mineralizer is located at a point along the tertiary air duct.

* * * * *